(12) United States Patent
Kobushi et al.

(10) Patent No.: US 8,198,376 B2
(45) Date of Patent: Jun. 12, 2012

(54) PROCESS FOR PRODUCTION OF WATER-ABSORBABLE RESIN

(75) Inventors: Hiromu Kobushi, Kako-gun (JP); Masayoshi Handa, Himeji (JP); Yasuhiro Nawata, Kako-gun (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 248 days.

(21) Appl. No.: 12/374,817

(22) PCT Filed: Jul. 17, 2007

(86) PCT No.: PCT/JP2007/064094
§ 371 (c)(1),
(2), (4) Date: Jan. 23, 2009

(87) PCT Pub. No.: WO2008/013078
PCT Pub. Date: Jan. 31, 2008

(65) Prior Publication Data
US 2009/0326162 A1 Dec. 31, 2009

(30) Foreign Application Priority Data
Jul. 24, 2006 (JP) .................... 2006-200264

(51) Int. Cl.
*C08F 8/30* (2006.01)
*C08L 63/00* (2006.01)
(52) U.S. Cl. .................... 525/329.9; 523/418
(58) Field of Classification Search .......... 525/26, 525/200, 199, 329.9; 526/317.1; 428/35.7, 428/34.3, 304.4; 524/393, 544, 368, 460; 523/201, 418; 522/24, 27, 28
See application file for complete search history.

(56) References Cited

U.S. PATENT DOCUMENTS

| | | | |
|---|---|---|---|
| 4,666,983 A | 5/1987 | Tsubakimoto et al. | |
| 5,409,771 A | 4/1995 | Dahmen et al. | |
| 5,859,112 A * | 1/1999 | Overbeek et al. | 524/460 |
| 6,297,319 B1 | 10/2001 | Nagasuna et al. | |
| 2004/0236049 A1 * | 11/2004 | Fuchs et al. | 526/317.1 |
| 2009/0239966 A1 * | 9/2009 | Matsumoto et al. | 522/24 |

FOREIGN PATENT DOCUMENTS

| | | | |
|---|---|---|---|
| DE | 40 20 780 C1 | | 8/1991 |
| JP | 58-180233 | | 10/1983 |
| JP | 04180910 | * | 6/1992 |
| JP | 6-322368 | | 11/1994 |
| JP | 8-27278 | | 1/1996 |
| JP | 2000-197818 | | 7/2000 |
| JP | 2003-73443 | | 3/2003 |
| JP | 2003-313446 | | 11/2003 |
| JP | 2006176570 | * | 7/2006 |
| JP | 2007-119510 | * | 5/2007 |

* cited by examiner

*Primary Examiner* — Ling Choi
*Assistant Examiner* — Monique Peets
(74) *Attorney, Agent, or Firm* — Oblon, Spivak, McClelland, Maier & Neustadt, L.L.P.

(57) ABSTRACT

A method for producing a water-absorbent resin, characterized in that a precursor of the water-absorbent resin obtained by polymerizing a water-soluble ethylenically unsaturated monomer is subjected to a post-crosslinking reaction in the presence of a compound having plural hydrazide groups. The water-absorbent resin obtained by the method for producing a water-absorbent resin of the present invention is excellent in properties such as water-retention capacity, water-absorption capacity under load, and gel strength, and also gives consideration to safety of the water-absorbent resin by reducing water-soluble substance. Therefore, the water-absorbent resin of the present invention can be suitably used, for example, in hygienic materials such as disposable diaper, incontinence pad and sanitary napkin, in particular, in disposable diaper.

20 Claims, 2 Drawing Sheets

[Figure 1]
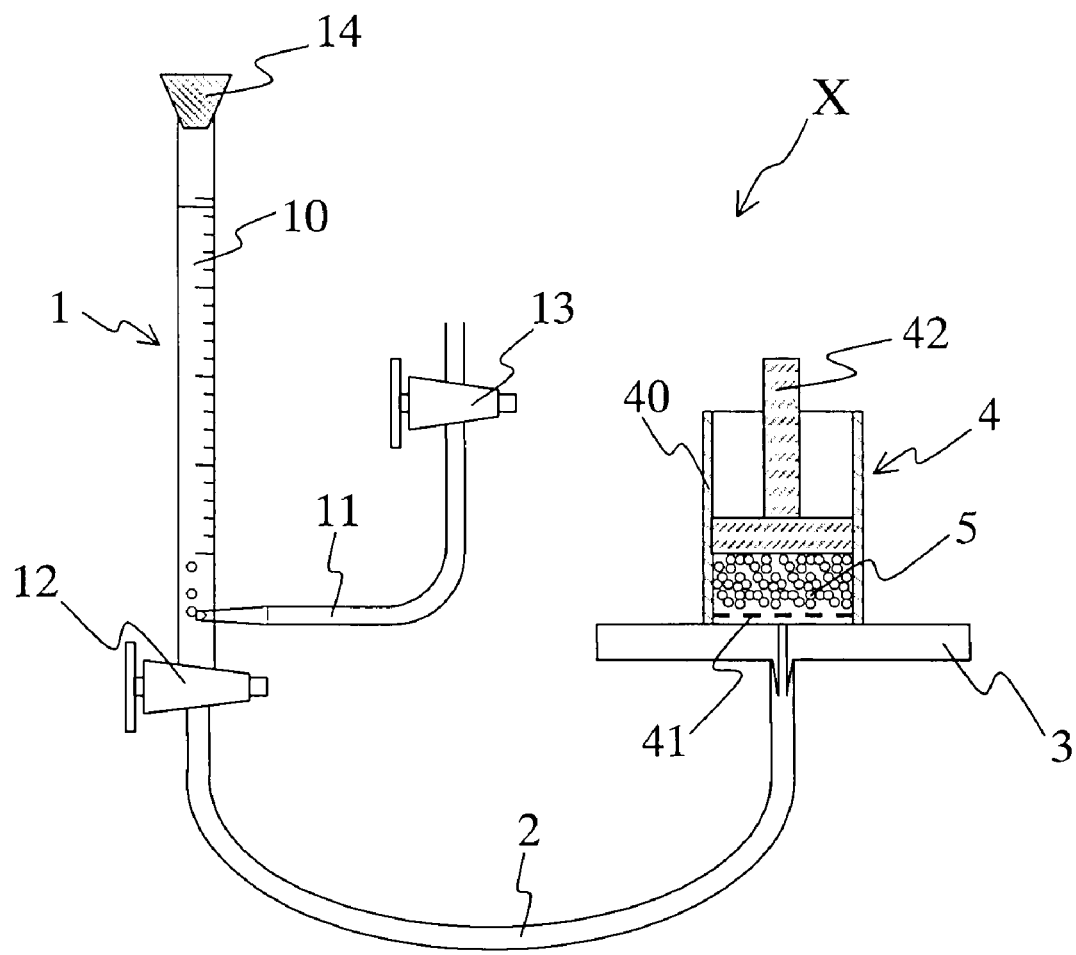

[Figure 2]
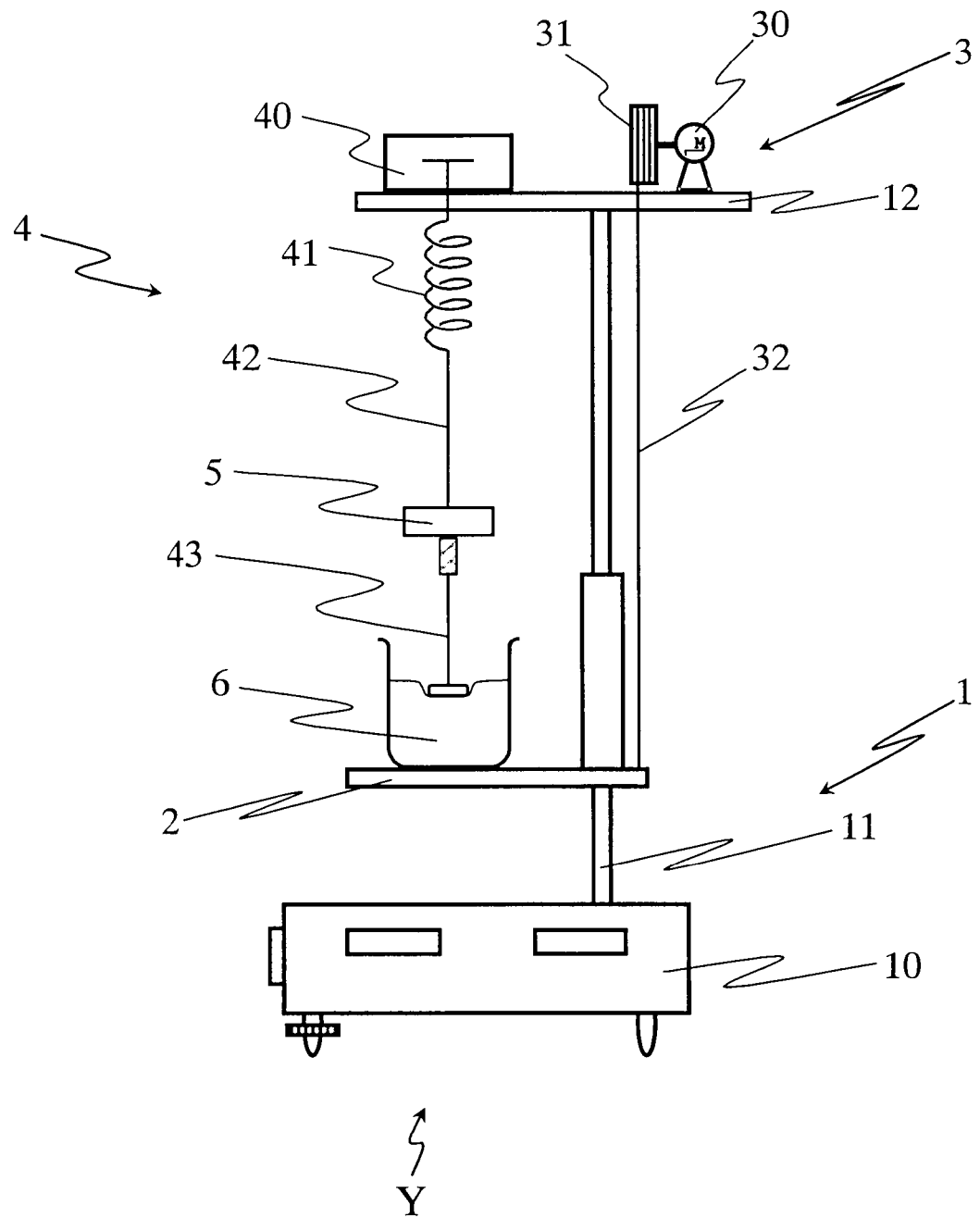

PROCESS FOR PRODUCTION OF WATER-ABSORBABLE RESIN

CROSS-REFERENCE TO RELATED APPLICATIONS

The present application is a 35 U.S.C. §371 National Stage patent application of International patent application PCT/JP07/64094, filed on Jul. 17, 2007, which claims priority to Japanese patent application 2006-200264, filed on Jul. 24, 2006.

TECHNICAL FIELD

The present invention relates to a method for producing a water-absorbent resin and a water-absorbent resin obtained by the method. More specifically, the present invention relates to a method for producing a water-absorbent resin which can be suitably used in hygienic materials such as disposable diaper, incontinence pad and sanitary napkin; and a water-absorbent resin obtained by the method.

BACKGROUND ART

Conventionally, a water-absorbent resin has been widely used in hygienic materials such as disposable diaper and sanitary napkin, and industrial materials such as water blocking materials for cables. As the water-absorbent resin, there has been known, for example, hydrolysates of starch-acrylonitrile graftcopolymers, neutralized products of starch-acrylate graftpolymers, saponified products of vinyl acetate-acrylic ester copolymers, partially neutralized products of polyacrylic acid, and the like.

It has been desired that the water-absorbent resin used in hygienic materials or the like is excellent in properties such as water-retention capacity, water-absorption capacity under load, and gel strength. Also in the past, in order to improve the above-mentioned properties, many studies have been made on a method of increasing a crosslinking density on a surface layer of the water-absorbent resin (post-crosslinking method) and the like. For example, a method including the steps of mixing a carbonate compound such as ethylene carbonate and heat-treating the mixture (Patent Publication 1), a method including the steps of mixing a polyhydric alcohol compound and heat-treating the mixture (Patent Publication 2), and the like have been known.

On the other hand, since the water-absorbent resin is used in a hygienic material contacting to the human body (skin). Therefore, in recent years, it is desired that the water-absorbent resin gives consideration also to safety for the skin, and, as a method for improving the water-absorbent resin, a method which gives consideration to safety of the water-absorbent resin by using a crosslinking agent having high safety, reducing water-soluble substance, or the like tends to be studied.

In recent years, as a method for improving the above-mentioned properties while giving consideration to safety, for example, there has been suggested a method of increasing a crosslinking density on a surface layer of the water-absorbent resin, according to a method including the step of mixing with an oxetane compound and a water-soluble additive (see Patent Publication 3), a method including the steps of mixing with a ketal compound or an acetal compound and heat-treating the mixture (see Patent Publication 4), a method including the steps of mixing with a specified oxazoline compound and treating the mixture (see Patent Publication 5), or the like.

Patent Publication 1: German Patent No. 4020780
Patent Publication 2: Japanese Patent Laid-Open No. Sho 58-180233
Patent Publication 3: Japanese Patent Laid-Open No. 2003-313446
Patent Publication 4: Japanese Patent Laid-Open No. Hei 08-027278
Patent Publication 5: Japanese Patent Laid-Open No. 2000-197818

SUMMARY OF THE INVENTION

The present invention relates to:
[1] a method for producing a water-absorbent resin, characterized in that a precursor of the water-absorbent resin obtained by polymerizing a water-soluble ethylenically unsaturated monomer is subjected to a post-crosslinking reaction in the presence of a compound having plural hydrazide groups; and
[2] a water-absorbent resin obtained by the method as defined in the above [1], characterized in that the water-absorbent resin has a retention capacity of saline solution of 25 g/g or more, an absorption capacity of saline solution under a load of 2.07 kPa of 15 mL/g or more, a gel strength of 900 Pa or more, and a water-soluble substance of 20% by mass or less.

BRIEF DESCRIPTION OF THE DRAWINGS

FIG. 1 is a schematic view of an apparatus for determining absorption capacity of saline solution under load of the water-absorbent resin.

FIG. 2 is a schematic view of an apparatus for determining gel strength of the water-absorbent resin.

EXPLANATION OF NUMERICAL SYMBOLS

X apparatus for determining water-absorption capacity
  1 buret section
    10 buret
    11 air introduction tube
    12 cock
    13 cock
    14 rubber plug
  2 lead tube
  3 measuring board
  4 measuring section
    40 cylinder
    41 nylon mesh
    42 weight
  5 water-absorbent resin
Y apparatus for determining gel strength
  1 supporting section
    10 supporting board
    11 pole
    12 counter
  2 movable plate
  3 section for driving movable plate
    30 pulse motor
    31 pulley
    32 wire
  4 measuring section
    40 load cell
    41 precision spring
    42 connecting axis
    43 pressure-sensitive axis 5 weight
6 measurement sample (gel)

DETAILED DESCRIPTION OF THE INVENTION

The present invention relates to a method for producing a water-absorbent resin which can be suitably used in hygienic materials, which is excellent in properties such as water-retention capacity, water-absorption capacity under load, and gel strength, and is also excellent in safety for the human body by reducing water-soluble substance; and a water-absorbent resin obtained by the method.

Conventionally, production of a water-absorbent resin which is excellent in properties such as water-retention capacity, water-absorption capacity under load, and gel strength, and is also excellent in safety by reducing water-soluble substance or the like has been studied. However, a water-absorbent resin which sufficiently satisfies water-absorption properties and safety has never been obtained.

The present inventors have found that, upon the production of the water-absorbent resin, a precursor of the water-absorbent resin is subjected to a post-crosslinking reaction in the presence of a compound having plural hydrazide groups, whereby the resulting water-absorbent resin has an appropriate water-retention capacity, a high water-absorption capacity under load and a high gel strength, and is also excellent in safety since water-soluble substance is reduced. The present invention has been accomplished thereby.

According to the present invention, a surface layer of a precursor of the water-absorbent resin is evenly crosslinked in a high crosslinking density by using the specified post-crosslinking agent, whereby a water-absorbent resin which can be suitably used in hygienic materials, which is excellent in properties such as water-retention capacity, water-absorption capacity under load, and gel strength, and is also excellent in safety for the human body by reducing water-soluble substance, can be obtained.

The present invention is specifically explained hereinbelow.

In the present invention, a method of polymerizing a water-soluble ethylenically unsaturated monomer to obtain a precursor of the water-absorbent resin is not particularly limited, and includes an aqueous solution polymerization method, a reversed-phase suspension polymerization method, and the like, which are the representative polymerization methods.

In the present specification, as one example of the embodiments, the reversed-phase suspension polymerization method is explained in more detail. In the above-mentioned method, a reversed-phase suspension polymerization of a water-soluble ethylenically unsaturated monomer in a water-in-oil system is carried out, for example, using a radical polymerization initiator, in a petroleum hydrocarbon solvent containing a surfactant and/or a polymeric dispersing agent, in the presence of a crosslinking agent and a chain transfer agent as occasion demands. Incidentally, in the above-mentioned reversed-phase suspension polymerization method, a precursor of the water-absorbent resin can be obtained by additionally adding the water-soluble ethylenically unsaturated monomer to a precursor of the water-absorbent resin obtained by the reversed-phase suspension polymerization and carrying out a polymerization in multi-steps of two or more steps.

The water-soluble ethylenically unsaturated monomer includes, for example, (meth)acrylic acid, 2-(meth)acrylamide-2-methylpropanesulfonic acid and salts thereof; nonionic unsaturated monomers such as (meth)acrylamide, N,N-dimethyl(meth)acrylamide, 2-hydroxyethyl(meth)acrylate, and N-methylol(meth)acrylamide; amino group-containing unsaturated monomers such as diethylaminoethyl(meth)acrylate and diethylaminopropyl(meth)acrylate, and quaternary compounds thereof; and the like. These may be used alone or in combination of two or more kinds. Here, "(meth)acryl-" herein means "acryl-" and "methacryl-."

Among the water-soluble ethylenically unsaturated monomers, preferred ones include (meth)acrylic acid and salts thereof, (meth)acrylamide, N,N-dimethyl(meth)acrylamide and the like, from the viewpoint of being industrially easily available. Even more preferred ones include (meth)acrylic acid and salts thereof, from the viewpoint of economical advantage.

The water-soluble ethylenically unsaturated monomer can be usually used in the form of an aqueous solution. It is preferable that the concentration of the water-soluble ethylenically unsaturated monomers in the aqueous solution of the water-soluble ethylenically unsaturated monomers is from 15% by mass to a saturated concentration.

In the aqueous solution of the water-soluble ethylenically unsaturated monomer, when the water-soluble ethylenically unsaturated monomer used has an acid group, the acid group may be neutralized with an alkaline neutralizer such as an alkali metal salt or an ammonium salt. It is preferable that the degree of neutralization by the alkaline neutralizer is from 10 to 100% by mol of the acid group of the water-soluble ethylenically unsaturated monomer before the neutralization, from the viewpoint of increasing osmotic pressure and increasing water-absorption rate of the resulting water-absorbent resin, and not causing any disadvantages in safety or the like due to the presence of an excess alkaline neutralizer. The alkali metal salt and the ammonium salt include lithium, sodium, potassium, ammonium, and the like. Among them, sodium, potassium, and ammonium are preferable, and sodium is more preferable.

The radical polymerization initiator includes, for example, persulfates such as potassium persulfate, ammonium persulfate, and sodium persulfate; peroxides such as methyl ethyl ketone peroxide, methyl isobutyl ketone peroxide, di-tert-butyl peroxide, tert-butyl cumyl peroxide, tert-butyl peroxyacetate, tert-butyl peroxyisobutyrate, tert-butyl peroxypivalate, and hydrogen peroxide; azo compounds such as 2,2'-azobis(2-amidinopropane)dihydrochloride, 2,2'-azobis[2-(N-phenylamidino)propane]dihydrochloride, 2,2'-azobis[2-(N-allylamidino)propane]dihydrochloride, 2,2'-azobis {2-[1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid); and the like. These radical polymerization initiators may be used alone or in combination of two or more kinds. Among them, potassium persulfate, ammonium persulfate, sodium persulfate, and 2,2'-azobis(2-amidinopropane)dihydrochloride are preferable, from the viewpoint of being easily available and excellent in storage stability.

The radical polymerization initiator is usually used in each reaction step in an amount of preferably from 0.005 to 1% by mol, based on the total amount of the water-soluble ethylenically unsaturated monomer in each reaction step. When the amount used is 0.005% by mol or more, it is preferable since the reaction in a short period of time is possible. When the amount used is 1% by mol or less, it is preferable since the polymerization reaction proceeds in an appropriate rate.

The above-mentioned radical polymerization initiator can be used as a redox polymerization initiator together with a reducing agent such as sodium sulfite, sodium hydrogen sulfite, ferrous sulfite, and L-ascorbic acid.

The petroleum hydrocarbon solvent includes, for example, aliphatic hydrocarbons such as n-hexane, n-heptane, n-octane, and ligroin; alicyclic hydrocarbons such as cyclopentane, methylcyclopentane, cyclohexane, and methylcyclohexane; aromatic hydrocarbons such as benzene, toluene, and xylene; and the like. Among them, n-hexane, n-heptane, and cyclohexane are preferable, from the viewpoint of being industrially easily available, stable in quality, and inexpensive. These petroleum hydrocarbon solvents may be used alone or may be used in combination of two or more kinds.

The petroleum hydrocarbon solvent is usually contained in an amount of preferably from 50 to 600 parts by mass, and more preferably from 80 to 550 parts by mass, based on the total amount of 100 parts by mass of the water-soluble ethylenically unsaturated monomer in each reaction step, from the viewpoint of removing heat of polymerization and making the polymerization temperature easier to control.

The surfactant includes, for example, polyglycerol fatty acid esters, sucrose fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallylformaldehyde condensed polyoxyethylene ethers, polyoxyethylene polyoxypropylene block copolymer, polyoxyethylene polyoxypropyl alkyl ethers, polyethylene glycol fatty acid esters, polyoxyethylene alkylamines, phosphoric esters of polyoxyethylene alkyl ethers, and phosphoric esters of polyoxyethylene alkylallyl ethers. Among them, sorbitan fatty acid esters, polyglycerol fatty acid esters and sucrose fatty acid esters are preferable. These surfactants may be used alone or in combination of two or more kinds.

The polymeric dispersing agent includes, for example, maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethyl cellulose, and ethyl hydroxyethyl cellulose. Among them, maleic anhydride-modified polyethylene, maleic anhydride-modified polypropylene, maleic anhydride-modified ethylene-propylene copolymer, oxidized polyethylene and ethylene-acrylic acid copolymer are preferable, from the viewpoint of dispersion stability of the aqueous solution of the monomer. These polymeric dispersing agents may be used alone or in combination of two or more kinds.

Each of the surfactant and/or the polymeric dispersing agent is used in an amount of preferably from 0.1 to 5 parts by mass, and more preferably from 0.2 to 3 parts by mass, based on the total amount of 100 parts by mass of the aqueous solution of the water-soluble ethylenically unsaturated monomer in each reaction step. When the each amount of the surfactant and the polymeric dispersing agent used is 0.1 parts by mass or more, it is preferable since favorable dispersion stability during polymerization is obtained. When the each amount used is 5 parts by mass or less, it is preferable since dispersion stability accounting to the amount used is obtained and it is economically excellent.

In the present invention, the polymerization reaction can be carried out in the presence of an internal crosslinking agent of the polymerization reaction. As the internal crosslinking agent, for example, a compound having two or more polymerizable unsaturated groups can be used. The compound having two or more polymerizable unsaturated groups includes, for example, unsaturated (poly)esters obtained by reacting polyols such as (poly)ethylene glycol [The term "(poly)" means cases where the prefix "poly" is included and where the prefix is not included. In other words, "(poly)" means a polymer compound and a monomer compound. Hereinafter referred to the same], (poly)propylene glycol, 1,4-butanediol, trimethylolpropane, polyoxyethylene glycol, polyoxypropylene glycol, or (poly)glycerol with an unsaturated acid such as (meth)acrylic acid, maleic acid or fumaric acid; bisacrylamides such as N,N'-methylenebisacrylamide; di- or tri(meth)acrylate esters obtained by reacting a polyepoxide with (meth)acrylic acid; carbamyl esters of di(meth)acrylic acid obtained by reacting a polyisocyanate such as tolylene diisocyanate or hexamethylene diisocyanate with hydroxyethyl (meth)acrylate; allylated starch, allylated cellulose, diallyl phthalate, N,N',N"-triallyl isocyanurate, divinylbenzene, and the like.

In addition, as the other internal crosslinking agents, a compound having a reactive functional group capable of reacting with a carboxyl group can be used. The compound having a reactive functional group capable of reacting with a carboxyl group includes, for example, hydroxyalkyl(meth)acrylates such as hydroxymethyl(meth)acrylate and hydroxyethyl(meth)acrylate; N-hydroxyalkyl(meth)acrylamides such as N-hydroxymethyl(meth)acrylamide and N-hydroxyethyl(meth)acrylamide; and the like.

These internal crosslinking agents may be used alone or in combination of two or more kinds.

The internal crosslinking agent is used in an amount of preferably 1% by mol or less, and more preferably 0.5% by mol or less, based on the total amount of the water-soluble ethylenically unsaturated monomer used in each reaction step, from the viewpoint of sufficiently enhancing absorption properties of the resulting water-absorbent resin. Here, the reason why the addition of the internal crosslinking agent is optional is that the water-absorption capacity of the water-absorbent resin can be controlled also by adding a crosslinking agent for subjecting the water-absorbent resin to crosslinking on their surface layer in any steps from after the polymerization of the monomers to drying.

In addition, in order to control water-absorption properties of the water-absorbent resin, a chain transfer agent may be added. As the above-mentioned chain transfer agent, hypophosphites, phosphites, thiols, secondary alcohols, amines and the like can be exemplified.

The reaction temperature upon the polymerization reaction differs depending upon the radical polymerization initiator used. The reaction temperature is preferably from 20° to 110° C. and more preferably from 40° to 90° C., from the viewpoint of rapidly progressing the polymerization and shortening the polymerization time, thereby increasing productivity and easily removing heat of polymerization, to smoothly carry out the reaction. The reaction time of each step is usually from 0.1 to 4 hours.

Water and the petroleum hydrocarbon solvent may be removed from the mixture after the polymerization reaction, for example, by heating the mixture at a temperature of from 80° to 200° C.

Thus, the reversed-phase suspension polymerization is carried out, to give a precursor of the water-absorbent resin.

In the present invention, it is characterized in that a compound having plural hydrazide groups is added as a post-crosslinking agent to the above-mentioned precursor of the water-absorbent resin, to carry out a post-crosslinking reaction.

The compound having plural hydrazide groups includes, for example, carbodihydrazide, malonic acid dihydrazide, maleic acid dihydrazide, itaconic acid dihydrazide, fumaric acid dihydrazide, adipic acid dihydrazide, sebacic acid dihydrazide, dodecanedioic acid dihydrazide, isophthalic acid dihydrazide, 1,6-hexamethylene bissemicarbazide, 4,4'-(methylene-di-p-phenylene)disemicarbazide, and the like. Among them, carbodihydrazide, malonic acid dihydrazide, adipic acid dihydrazide, and dodecanedioic acid dihydrazide, are preferably used. These may be used alone or in combination of two or more kinds.

The amount of compound having plural hydrazide groups cannot be unconditionally determined because the amount differs depending upon the kinds of the compound used. The compound having plural hydrazide groups is usually contained in an amount of preferably from 0.0001 to 2% by mol, and more preferably from 0.001 to 1.5% by mol, based on the total amount of the water-soluble ethylenically unsaturated monomer used to obtain the precursor of the water-absorbent resin. When the compound having plural hydrazide groups is contained in an amount of 0.0001% by mol or more, the post-crosslinking reaction is more likely to proceed, and water-absorption capacity under load gets higher. When the compound having plural hydrazide groups is contained in an amount of 2% by mol or less, it is preferable since the post-crosslinking reaction can be efficiently carried out, and also productivity is high.

In the present invention, it is also possible to formulate a conventionally known crosslinking agent, in addition to the above-mentioned compound having plural hydrazide groups, during the post-crosslinking reaction.

The post-crosslinking agent may be dissolved in water, an organic solvent, or the like, and used.

The timing for adding the post-crosslinking agent is not particularly limited, as long as the timing is after the precursor of the water-absorbent resin is obtained by polymerizing the water-soluble ethylenically unsaturated monomer. For example, a method including the step of adding the post-crosslinking agent to a water-containing gel of the precursor of the water-absorbent resin after polymerization, a method including the steps of adjusting water in the precursor of the water-absorbent resin by dehydrating and drying a water-containing gel after polymerization, and thereafter adding the post-crosslinking agent thereto, a method including the step of adding the post-crosslinking agent to the precursor of the water-absorbent resin obtained by dehydrating and drying a water-containing gel after polymerization, together with an appropriate amount of water (here, the precursor of the water-absorbent resin may be used in a state of dispersing in a petroleum hydrocarbon solvent, as occasion demands), and the like are included. The post-crosslinking agent is added to the precursor of the water-absorbent resin, and thereafter, for example, the post-crosslinking reaction is carried out while distilling off water and/or a petroleum hydrocarbon solvent by heating, whereby the water-absorbent resin of the present invention can be obtained.

The reaction temperature upon the post-crosslinking reaction differs depending upon the post-crosslinking agent used. The reaction temperature is preferably from 50° to 200° C., more preferably from 80° to 190° C., even more preferably from 100° to 180° C., and even further more preferably from 130° to 180° C., from the viewpoint of smoothly carrying out the post-crosslinking reaction. In addition, the reaction time is preferably from 0.1 to 5 hours, and more preferably from 0.5 to 4 hours.

In addition, for the purpose of accelerating a reaction of the compound having plural hydrazide groups, in other words, for the purpose of lowering the reaction temperature and shortening the reaction time in the post-crosslinking reaction, a reaction catalyst such as acetic acid, lactic acid, or phosphoric acid can be also added. It is desired that the reaction catalyst is added in an amount of from 0.0001 to 5 times by mol, based on the compound having plural hydrazide groups.

An additive such as a lubricant, a deodorizing agent or an antimicrobial agent may be further added to the water-absorbent resin of the present invention depending upon its purpose.

Thus, the water-absorbent resin obtained by the production method of the present invention has a retention capacity of saline solution of 25 g/g or more, an absorption capacity of saline solution under a load of 2.07 kPa of 15 mL/g or more, a gel strength of 900 Pa or more, and has a water-soluble substance of 20% by mass or less. Since the water-absorbent resin obtained by the production method of the present invention has an appropriate water-retention capacity, a high water-absorption capacity under load, a high gel strength, and a low water-soluble substance, the water-absorbent resin can be suitably used in hygienic materials.

Here, retention capacity of saline solution, absorption capacity of saline solution under load, gel strength, water-soluble substance, and drying loss (water content) are the values determined according to the determination method described as set forth below.

The water-absorbent resin of the present invention has a retention capacity of saline solution of preferably 25 g/g or more, more preferably 27 g/g or more, and even more preferably 30 g/g or more, from the viewpoint of, upon being used in a hygienic material, increasing absorption capacity and lowering the amount of re-wet of liquid.

In addition, the water-absorbent resin of the present invention has an absorption capacity of saline solution under a load of 2.07 kPa of preferably 15 mL/g or more, more preferably 17 mL/g or more, and even more preferably 20 mL/g or more, from the viewpoint of, upon being used as a hygienic material, lowering the amount of re-wet in a case where pressure is applied to the hygienic material after liquid absorption. Similarly, the water-absorbent resin of the present invention has an absorption capacity of saline solution under a load of 4.14 kPa of preferably 7 mL/g or more, more preferably 10 mL/g or more, and even more preferably 15 mL/g or more.

Further, the water-absorbent resin of the present invention has a gel strength of preferably 900 Pa or more, more preferably 1200 Pa or more, and even more preferably 1500 Pa or more, from the viewpoint of, upon being used in a hygienic material, maintaining shape of gel in the hygienic material after liquid absorption and securing flow of the liquid, thereby increasing diffusion of the liquid.

The water-absorbent resin of the present invention has a water-soluble substance of preferably 20% by mass or less, more preferably 19% by mass or less, and even more preferably 18% by mass or less, from the viewpoint of, upon being used in a hygienic material, reducing the generation of "slimy substance" due to elution of the water-soluble substance and preventing irritation of the skin.

Thus, a precursor of the water-absorbent resin is obtained by polymerizing a water-soluble ethylenically unsaturated monomer, and thereafter, a compound having plural hydrazide groups is added thereto as a post-crosslinking agent, to carry out a post-crosslinking reaction, whereby a water-absorbent resin which is excellent in properties such as water-retention capacity, water-absorption capacity under load, and gel strength, and is also excellent in safety for the human body by reducing water-soluble substance, can be obtained.

The reason why the water-absorbent resin having excellent properties as described above can be obtained is not clear. Although not wanting to be limited by theory, the reason can be presumed as follows. In other words, it is considered that the reason is due to the fact that, a precursor of the water-absorbent resin is reacted in the presence of a compound having plural hydrazide groups as a post-crosslinking agent, whereby a reaction of a carboxyl group and a hydrazide group in the water-absorbent resin proceeds in an appropriate rate, so that a surface layer of the water-absorbent resin can be evenly crosslinked in a high crosslinking density.

EXAMPLES

The present invention will be further specifically described hereinbelow by means of Production Examples, Examples and Comparative Examples, without intending to limit the scope of the present invention to these Production Examples and Examples.

Production Example 1

A cylindrical round bottomed separable flask having an internal diameter of 110 mm, equipped with a reflux condenser, a dropping funnel, a nitrogen gas inlet tube and a stirring blade was prepared. This flask was charged with 340 g of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. while stirring, to dissolve the surfactant, and thereafter the solution was cooled to 50° C.

On the other hand, a 500 mL-Erlenmeyer flask was charged with 92 g (1.02 mol) of an 80% by mass aqueous solution of acrylic acid, and 146.0 g of a 21% by mass aqueous sodium hydroxide was added dropwise thereto with cooling from external to neutralize 75% by mol. Thereafter, 0.11 g (0.41 mmol) of potassium persulfate and 9.2 mg (0.06 mmol) of N,N'-methylenebisacrylamide were added thereto to dissolve, to prepare an aqueous monomer solution for the first step.

The entire amount of this aqueous monomer solution for the first step was added to the above separable flask, and the internal of the system was sufficiently replaced with nitrogen. Thereafter, the flask was immersed in a water bath at 70° C. to raise the temperature, and the first-step polymerization was carried out for 1 hour and then cooled to a room temperature, to give a polymerization slurry of the first step.

On the other hand, an another 500 mL-Erlenmeyer flask was charged with 128.8 g (1.43 mol) of an 80% by mass aqueous solution of acrylic acid, and 159.0 g of a 27% by mass aqueous sodium hydroxide was added dropwise thereto with cooling from external to neutralize 75% by mol. Thereafter, 0.16 g (0.59 mmol) of potassium persulfate and 12.9 mg (0.08 mmol) of N,N'-methylenebisacrylamide were added thereto to dissolve, to prepare an aqueous monomer solution for the second step.

The entire amount of this aqueous monomer solution for the second step was added to the above slurry after polymerization, and the internal of the system was sufficiently replaced with nitrogen. Thereafter, the flask was again immersed in a water bath at 70° C. to raise the temperature, and the second-step polymerization was carried out for 1 hour.

After the second-step polymerization reaction, the reaction mixture was heated with an oil bath at 125° C., whereby only water was removed from the azeotropic mixture of n-heptane and water. Further, n-heptane in the internal of the system was removed by distillation, to give 237.5 g of a precursor of the water-absorbent resin (A1). The precursor of the water-absorbent resin at this point had a drying loss (water content) of 3%.

Production Example 2

A cylindrical round bottomed separable flask having an internal diameter of 110 mm, equipped with a reflux condenser, a dropping funnel, a nitrogen gas inlet tube and a stirring blade was prepared. This flask was charged with 340 g of n-heptane, and 0.92 g of a hexaglyceryl monobehenylate having an HLB of 13.1 (manufactured by Nippon Oil & Fats Co., Ltd., Nonion GV-106) and 0.92 g of a maleic anhydride-modified ethylene-propylene copolymer (manufactured by Mitsui Chemicals, Inc., Hi-wax 1105A) were added thereto. The temperature was raised to 80° C. while stirring, to dissolve the surfactant, and thereafter the solution was cooled to 50° C.

On the other hand, a 500 mL-Erlenmeyer flask was charged with 92 g (1.02 mol) of an 80% by mass aqueous solution of acrylic acid, and 146.0 g of a 21% by mass aqueous sodium hydroxide was added dropwise thereto with cooling from external to neutralize 75% by mol. Thereafter, 0.11 g (0.41 mmol) of potassium persulfate and 9.2 mg (0.06 mmol) of N,N'-methylenebisacrylamide were added thereto to dissolve, to prepare an aqueous monomer solution for the first step.

The entire amount of this aqueous monomer solution for the first step was added to the above separable flask, and the internal of the system was sufficiently replaced with nitrogen. Thereafter, the flask was immersed in a water bath at 70° C. to raise the temperature, and the first-step polymerization was carried out for 1 hour and then cooled to a room temperature, to give a polymerization slurry of the first step.

On the other hand, an another 500 mL-Erlenmeyer flask was charged with 128.8 g (1.43 mol) of an 80% by mass aqueous solution of acrylic acid, and 159.0 g of a 27% by mass aqueous sodium hydroxide was added dropwise thereto with cooling from external to neutralize 75% by mol. Thereafter, 0.16 g (0.59 mmol) of potassium persulfate and 12.9 mg (0.08 mmol) of N,N'-methylenebisacrylamide were added thereto to dissolve, to prepare an aqueous monomer solution for the second step.

The entire amount of this aqueous monomer solution for the second step was added to the above slurry after polymerization, and the internal of the system was sufficiently replaced with nitrogen. Thereafter, the flask was again immersed in a water bath at 70° C. to raise the temperature, and the second-step polymerization was carried out for 1 hour.

After the second-step polymerization reaction, the reaction mixture was heated with an oil bath at 125° C., whereby only water was removed from the azeotropic mixture of n-heptane and water. Further, n-heptane in the internal of the system was removed by distillation, to give 237.2 g of a precursor of the water-absorbent resin (A2). The precursor of the water-absorbent resin at this point had a drying loss (water content) of 4%.

Example 1

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 1 (A1) (Theoretical amount of the water-soluble ethylenically unsaturated monomer used to obtain the precursor: 0.52 mol) and 80 g of n-heptane. The internal temperature was raised to 80° C. Thereafter, 7.5 g of water was added thereto, and the mixture was kept at the same temperature for 10 minutes.

Thereafter, 10.0 g of a 5% aqueous solution of carbodihydrazide (5.6 mmol) was added thereto as a post-crosslinking agent, and mixed. This mixture was heated using an oil bath at 125° C., and water and n-heptane of the resulting mixture were removed by distillation. The post-crosslinking reaction was carried out for 1 hour while drying, to give 51.5 g of the water-absorbent resin of Example 1.

Example 2

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 2 (A2) (Theoretical amount of the water-soluble ethylenically unsaturated monomer used to obtain the precursor: 0.52 mol) and 80 g of n-heptane. The internal temperature was raised to 80° C. Thereafter, 7.5 g of water was added thereto, and the mixture was kept at the same temperature for 10 minutes.

Thereafter, 5.0 g of a 5% aqueous solution of adipic acid dihydrazide (1.4 mmol) was added thereto as a post-crosslinking agent, and mixed. This mixture was heated using an oil bath at 150° C., and water and n-heptane of the resulting mixture were removed by distillation. The post-crosslinking reaction was carried out for 2 hours while drying, to give 49.7 g of the water-absorbent resin of Example 2.

Example 3

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 2 (A2) (Theoretical amount of the water-soluble ethylenically unsaturated monomer used to obtain the precursor: 0.52 mol) and 80 g of n-heptane. The internal temperature was raised to 80° C. Thereafter, 7.5 g of water was added thereto, and the mixture was kept at the same temperature for 10 minutes.

Thereafter, 5.0 g of a 5% aqueous solution of adipic acid dihydrazide (1.4 mmol) was added thereto as a post-crosslinking agent, and mixed. This mixture was heated using an oil bath at 175° C., and water and n-heptane of the resulting mixture were removed by distillation. The post-crosslinking reaction was carried out for 1 hour while drying, to give 49.0 g of the water-absorbent resin of Example 3.

Example 4

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 1 (A1) (Theoretical amount of the water-soluble ethylenically unsaturated monomer used to obtain the precursor: 0.52 mol) and 80 g of n-heptane. The internal temperature was raised to 80° C. Thereafter, 7.5 g of water was added thereto, and the mixture was kept at the same temperature for 10 minutes.

Thereafter, 7.5 g of a 5% aqueous solution of adipic acid dihydrazide (2.2 mmol) as a post-crosslinking agent and 0.5 g of lactic acid (5.6 mmol) were added thereto, and mixed. This mixture was heated using an oil bath at 125° C., and water and n-heptane of the resulting mixture were removed by distillation. The post-crosslinking reaction was carried out for 2 hours while drying, to give 50.2 g of the water-absorbent resin of Example 4.

Example 5

A cylindrical round bottomed separable flask having an internal diameter of 110 mm, equipped with a reflux condenser, a dropping funnel, a nitrogen gas inlet tube and a stirring blade was prepared. This flask was charged with 340 g of n-heptane, and 0.92 g of a sucrose stearate having an HLB of 3 (manufactured by Mitsubishi-Kagaku Foods Corporation, Ryoto sugar ester S-370) and 0.92 g of a maleic anhydride-modified ethylene-propylene copolymer (manufactured by Mitsui Chemicals, Inc., Hi-wax 1105A) were added thereto. The temperature was raised to 80° C. while stirring, to dissolve the surfactant, and thereafter the solution was cooled to 50° C.

On the other hand, a 500 mL-Erlenmeyer flask was charged with 92 g (1.02 mol) of an 80% by mass aqueous solution of acrylic acid, and 146.0 g of a 21% by mass aqueous sodium hydroxide was added dropwise thereto with cooling from external to neutralize 75% by mol. Thereafter, 0.11 g (0.41 mmol) of potassium persulfate and 9.2 mg (0.06 mmol) of N,N'-methylenebisacrylamide were added thereto to dissolve, to prepare an aqueous monomer solution for the first step.

The entire amount of this aqueous monomer solution for the first step was added to the above separable flask, and the internal of the system was sufficiently replaced with nitrogen. Thereafter, the flask was immersed in a water bath at 70° C. to raise the temperature, and the first-step polymerization was carried out for 1 hour and then cooled to a room temperature, to give a polymerization slurry of the first step.

On the other hand, an another 500 mL-Erlenmeyer flask was charged with 128.8 g (1.43 mol) of an 80% by mass aqueous solution of acrylic acid, and 159.0 g of a 27% by mass aqueous sodium hydroxide was added dropwise thereto with cooling from external to neutralize 75% by mol. Thereafter, 0.16 g (0.59 mmol) of potassium persulfate and 12.9 mg (0.08 mmol) of N,N'-methylenebisacrylamide were added thereto to dissolve, to prepare an aqueous monomer solution for the second step.

The entire amount of this aqueous monomer solution for the second step was added to the above slurry after polymerization, and the internal of the system was sufficiently replaced with nitrogen. Thereafter, the flask was again immersed in a water bath at 70° C. to raise the temperature, and the second-step polymerization was carried out for 1 hour.

After the termination of polymerization reaction, the reaction mixture was heated with an oil bath at 125° C., whereby only water was removed in an amount of 111 g from the azeotropic mixture of n-heptane and water, to give a precursor of the water-absorbent resin (A3). To the resulting precursor of the water-absorbent resin (A3) was added 44.2 g of a 5% aqueous solution of adipic acid dihydrazide (12.7 mmol) as a post-crosslinking agent, and mixed. This mixture was heated using an oil bath at 125° C., and water and n-heptane of the resulting mixture were removed by distillation. The post-crosslinking reaction was carried out for 1.5 hours while drying, to give 237.8 g of the water-absorbent resin of Example 5.

Comparative Example 1

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 1 (A1) (Theoretical amount of the water-soluble ethylenically unsaturated monomer used to obtain the precursor: 0.52 mol) and 80 g of n-heptane.

The internal temperature was raised to 80° C. Thereafter, 5.0 g of a 10% aqueous solution of ethylene carbonate (5.7 mmol) was added thereto as a post-crosslinking agent, and mixed. This mixture was heated using an oil bath at 150° C., and water and n-heptane of the resulting mixture were removed by distillation. The post-crosslinking reaction was carried out for 2 hours while drying, to give 50.0 g of the water-absorbent resin of Comparative Example 1.

Comparative Example 2

A cylindrical round bottomed separable flask having an internal diameter of 110 mm, equipped with a stirrer, a stirring blade, a reflux condenser, a dropping funnel and a nitrogen gas inlet tube, was charged with 50 g of the precursor of the water-absorbent resin obtained in Production Example 2 (A2) (Theoretical amount of the water-soluble ethylenically unsaturated monomer used to obtain the precursor: 0.52 mol) and 80 g of n-heptane.

The internal temperature was raised to 80° C. Thereafter, 5.0 g of a 10% aqueous solution of 1,4-butanediol (5.5 mmol) was added thereto as a post-crosslinking agent, and mixed. This mixture was heated using an oil bath at 175° C., and water and n-heptane of the resulting mixture were removed by distillation. The post-crosslinking reaction was carried out for 2 hours while drying, to give 49.6 g of the water-absorbent resin of Comparative Example 2.

For the water-absorbent resins of Examples 1 to 5 and Comparative Examples 1 and 2, (1) the retention capacity of saline solution, (2) the absorption capacity of saline solution under load, (3) the gel strength, (4) the water-soluble substance and (5) the drying loss, were determined in accordance with the following procedures. The results are shown in Table 1.

(1) Retention Capacity of Saline Solution

The amount 2.0 g of water-absorbent resin were weighed in a cotton bag (Cottonbroad No. 60, width 100 mm×length 200 mm), and placed in a 500 mL-beaker. Physiological saline (0.9% by mass aqueous solution of sodium chloride, hereinafter referred to the same) was poured into the cotton bag in an amount of 500 g at one time, and the saline was dispersed so as not to generate an unswollen lump of the water-absorbent resin. The upper part of the cotton bag was tied up with a rubber band, and the cotton bag was allowed to stand for 30 minutes, to sufficiently swell the water-absorbent resin. The cotton bag was dehydrated for 1 minute with a dehydrator (manufactured by Kokusan Enshinki Co., Ltd., product number: H-122) set to have a centrifugal force of 167G, and the rubber band was unbound. The mass Wa(g) of the cotton bag containing swelled gels after the dehydration was determined. The same procedures were carried out without adding water-absorbent resin, and the empty mass Wb(g) of the cotton bag upon wetting was determined. The water-retention capacity was calculated from the following formula.

Retention Capacity of Saline Solution (g/g)=[$Wa-Wb$] (g)/Mass of Water-Absorbent Resin (g)   [Su 1]

(2) Absorption Capacity of Saline Solution Under Load

The absorption capacities of saline solution of water-absorbent resin under loads of 2.07 kPa and 4.14 kPa were determined using an apparatus X of which outline constitution was shown in FIG. 1.

The apparatus X shown in FIG. 1 comprises a buret section 1, a lead tube 2, a measuring board 3, and a measuring section 4 placed on the measuring board 3.

To the buret section 1 are connected a rubber plug 14 on the top of a buret 10, and an air introduction tube 11 and a cock 12 at the bottom portion of the buret 10, and further, the air introduction tube 11 has a cock 13 at the end.

The lead tube 2 is attached between the buret section 1 and the measuring board 3. The lead tube 2 has an inner diameter of 6 mm. A hole of a diameter of 2 mm is made at the central section of the measuring board 3, and the lead tube 2 is connected thereto.

The measuring section 4 has a cylinder 40 made of acrylic resin, a nylon mesh 41 adhered to the bottom part of the cylinder 40, and a weight 42. The cylinder 40 has an inner diameter of 20 mm.

The nylon mesh 41 has an opening of 75 μm (200 mesh), and water-absorbent resin 5 are evenly spread over the nylon mesh 41 upon the determination.

The weight 42 has a diameter of 19 mm and a mass of 59.8 g. This weight is placed on the water-absorbent resin 5, so that a 2.07 kPa load can be applied to the water-absorbent resin 5. In addition, when the weight 42 is replaced by a weight 42 having a diameter of 19 mm and a mass of 119.6 g, a 4.14 kPa load can be applied to the water-absorbent resin 5.

Next, the determination procedures will be described. The determination is carried out in a room at 25° C. First, the cock 12 and the cock 13 at the buret section 1 are closed, and a 0.9% by mass saline solution adjusted to 25° C. is poured from the top of the buret 10 and the top of the buret is plugged with the rubber plug 14. Thereafter, the cock 12 and the cock 13 at the buret section 1 are opened.

Next, the height of the measuring board 3 is adjusted so that the level of surface of the physiological saline flew out from a lead tube port in the central section of the measuring board 3 and the upper surface of the measuring board 3 are at the same height.

Separately, 0.10 g of the water-absorbent resin 5 is evenly spread over the nylon mesh 41 in the cylinder 40, and the weight 42 is placed on the water-absorbent resin 5, to prepare the measuring section 4. Thereafter, the measuring section 4 is placed so that its central section is in alignment with a lead tube port in the central section of the measuring board 3.

The volume reduction of 0.9% by mass saline solution in the buret 10, i.e., the volume of the physiological saline absorbed by the water-absorbent resin 5, Wc(mL), is read off, after 60 minutes passed from a time point where air bubbles were generated from the air introduction tube 11 into the buret 10, and the water-absorbent resin 5 started absorbing water. The absorption capacity of saline solution under load of the water-absorbent resin 5 was obtained by the following formula.

Absorption Capacity of Saline Solution Under Load (mL/g)=$Wc$ (mL)/Mass of Water-Absorbent Resin (g)　　　　[Su 2]

(3) Gel Strength

The gel strength of the water-absorbent resin of the present invention is a value obtained by determining gel with an apparatus Y (for example, Neocardmeter, manufactured by Iio Denki Co., product number: M-303) having the measurement principle shown in FIG. 2 as follows.

The apparatus Y consists of a supporting section 1, a movable plate 2 for mounting a measurement sample (gel) 6 thereon, a section for driving movable plate 3 for driving the movable plate 2, and a measuring section 4.

In the supporting section 1, a counter 12 is fixed at the top of a pole 11 stood on a supporting board 10. The movable plate 2 is attached to the pole 11, so that the plate can move up and down. A pulse motor 30 is mounted on the counter 12, and the movable plate 2 moves up and down through a wire 32 by rotating a pulley 31.

In addition, in the measuring section 4, a load cell 40 for measuring a distortion resulting from deformation is equipped with a pressure-sensitive axis 43 with a disk, through a precision spring 41 and a connecting axis 42. A diameter of the disk can vary depending on the measurement conditions. A weight 5 can be mounted on the top of the pressure-sensitive axis 43 with a disk.

The working principle of the apparatus Y is as follows.

The precision spring 41 is fixed at the load cell 40 (stress detector) on the upper side and connected to the pressure-sensitive axis 43 with a disk on the lower side, and is vertically hanged with mounting a predetermined weight 5. The movable plate 2 on which the measurement sample 6 is placed is elevated at a constant rate by rotation of the pulse motor 30. A constant rate of load is applied to the measurement sample 6 through the spring 41, and a distortion resulting from deformation is measured with the load cell 40, to calculate a hardness by the measurement.

The amount 49.0 g of physiological saline was weighed out in a 100 mL-beaker. A magnetic stirrer bar (8 mm $\phi \times$ 30 mm, ringless) was placed therein, and the beaker was placed on a magnetic stirrer (HS-30D, manufactured by iuchi). Subsequently, the magnetic stirrer bar was adjusted so as to rotate at a rate of 600 r/min. In addition, a bottom of a vortex generated by rotation of the magnetic stirrer bar was adjusted so as to be near an upper portion of the magnetic stirrer bar.

Next, 1.0 g of the water-absorbent resin was placed in the beaker while stirring. The stirring was continued until a rolling vortex disappeared to make a liquid level horizontal, thereby a gel to be the measurement sample 6 was prepared.

After 60 minutes, a hardness value of the gel was determined with the apparatus Y (Neocardmeter, manufactured by Iio Denki Co., product number: M-303, disk of pressure-sensitive axis: 16 mm $\phi$, load: 100 g, speed: 7 sec/inch, viscous mode). The gel strength was calculated from the resulting hardness value (dyne/cm$^2$) by the following formula (0.1: unit correction coefficient (dyne/cm$^2 \rightarrow$ Pa)).

Gel Strength (Pa)=[Hardness Value]$\times$0.1　　　　[Su 3]

(4) Water-Soluble Substance

The amount 500 g of physiological saline was weighed out in a 500 mL-beaker. A magnetic stirrer bar (8 mm $\phi \times$ 30 mm, ringless) was placed therein, and the beaker was placed on a magnetic stirrer (HS-30D, manufactured by iuchi). Subsequently, the magnetic stirrer bar was adjusted so as to rotate at a rate of 600 r/min. In addition, a bottom of a vortex generated by rotation of the magnetic stirrer bar was adjusted so as to be near an upper portion of the magnetic stirrer bar.

Next, 2.0 g of water-absorbent resin was quickly poured between the center of vortex in the beaker and the side of the beaker and dispersed therein, and the mixture was stirred for 3 hours. The aqueous dispersion of the water-absorbent resin after stirring for 3 hours was filtered with a JIS standard sieve (opening of sieve: 75 µm), and the resulting filtrate was further subjected to suction filtration using a Kiriyama type funnel (Filter Paper No. 6).

The amount 80±0.0005 g of the resulting filtrate was weighed out in a 100 mL-beaker dried at 140° C. beforehand to a constant weight and cooled to a room temperature. The filtrate was dried with a forced convection oven (manufactured by ADVANTEC) set at an internal temperature of 140° C. until a constant weight was attained, and a mass Wd(g) of the solid content of the filtrate was determined.

On the other hand, the same procedures as the above were carried out without using the water-absorbent resin, and a blank mass We(g) was determined. The water-soluble substance was calculated from the following formula.

Water-Soluble Substance (% by mass)=[[(Wd–We)$\times$(500/80)]/2$\times$100　　　　[Su 4]

(5) Drying Loss (Water Content)

The amount 2.0 g of the water-absorbent resin was precisely weighed out (Wg(g)) in an aluminum foil case (No. 8) of which constant weight (Wf(g)) was previously attained. The above sample was dried for 2 hours with a forced convection oven (manufactured by ADVANTEC) set at an internal temperature of 105° C. Thereafter, the dried sample was allowed to be cooled in a desiccator, and a mass Wh(g) after drying was determined. The water content of the water-absorbent resin was calculated from the following formula.

Drying Loss (% by Mass)=[(Wg–Wf)–(Wh–Wf)]/(Wg–Wf)$\times$100　　　　[Su 5]

TABLE 1

| | Precursor of Water-Absorbent Resin | Post-Crosslinking Agent | Reaction Temperature [° C.] | Water-Retention Capacity [g/g] | Water-Absorption Capacity Under Load [mL/g] | | Gel Strength [Pa] | Water-Soluble Substance [% by Mass] | Drying Loss [% by Mass] |
|---|---|---|---|---|---|---|---|---|---|
| | | | | | 2.07 kPa | 4.14 kPa | | | |
| Ex. 1 | A1 | Carbodihydrazide | 125 | 32 | 21 | 9 | 1673 | 16 | 9.1 |
| Ex. 2 | A2 | Adipic Acid Dihydrazide | 150 | 39 | 26 | 17 | 1664 | 18 | 0.6 |
| Ex. 3 | A2 | Adipic Acid Dihydrazide | 175 | 34 | 29 | 23 | 1912 | 17 | 0.1 |
| Ex. 4 | A1 | Adipic Acid Dihydrazide [1)] | 125 | 30 | 26 | 21 | 1783 | 15 | 4.9 |
| Ex. 5 | A3 | Adipic Acid Dihydrazide | 125 | 31 | 21 | 8 | 1624 | 16 | 8.5 |

TABLE 1-continued

| | Precursor of Water-Absorbent Resin | Post-Crosslinking Agent | Reaction Temperature [°C.] | Water-Retention Capacity [g/g] | Water-Absorption Capacity Under Load [mL/g] 2.07 kPa | Water-Absorption Capacity Under Load [mL/g] 4.14 kPa | Gel Strength [Pa] | Water-Soluble Substance [% by Mass] | Drying Loss [% by Mass] |
|---|---|---|---|---|---|---|---|---|---|
| Comp. Ex. 1 | A1 | Ethylene Carbonate | 150 | 51 | 8 | 8 | 480 | 24 | 1.2 |
| Comp. Ex. 2 | A2 | 1,4-Butanediol | 175 | 40 | 22 | 14 | 1151 | 22 | 0.6 |

[1]) Lactic acid is used together as a reaction catalyst during post-crosslinking reaction.

It can be seen from the results shown in Table 1 that the water-absorbent resin obtained in each Example has an appropriate water-retention capacity, a high water-absorption capacity under load, a high gel strength, and a low water-soluble substance. Further, it can be seen that the water-absorption capacity under a load of 4.14 kPa is improved by raising the reaction temperature (Examples 2 and 3) or adding the reaction catalyst (Example 4).

The water-absorbent resin obtained by the method for producing a water-absorbent resin of the present invention is excellent in properties such as water-retention capacity, water-absorption capacity under load, and gel strength, and also gives consideration to safety of the water-absorbent resin by reducing water-soluble substance. Therefore, the water-absorbent resin of the present invention can be suitably used, for example, in hygienic materials such as disposable diaper, incontinence pad and sanitary napkin, in particular, in disposable diaper.

The invention claimed is:

1. A method for producing a water-absorbent resin, comprising:
    post-crosslinking a precursor of the water-absorbent resin obtained by polymerizing a water-soluble ethylenically unsaturated monomer with a compound having plural hydrazide groups.

2. The method according to claim 1, wherein the compound having plural hydrazide groups is at least one member selected from the group consisting of carbodihydrazide, malonic acid dihydrazide, adipic acid dihydrazide, and dodecanedioic acid dihydrazide.

3. The method according to claim 1, wherein the compound having plural hydrazide groups is present in an amount of from 0.0001% to 2% by mol, based on the total amount of the water-soluble ethylenically unsaturated monomer from which the precursor of the water-absorbent resin is obtained.

4. A water-absorbent resin obtained by the method as defined in claim 1, the water-absorbent resin has a retention capacity of saline solution of 25 g/g or more, an absorption capacity of saline solution under a load of 2.07 kPa of 15 mL/g or more, a gel strength of 900 Pa or more, and a water-soluble substance of 20% by mass or less.

5. The method for producing a water-absorbent resin according to claim 1, wherein the water-soluble ethylenically unsaturated monomer is at least one selected from the group consisting of (meth)acrylic acid, 2-(meth)acrylamide-2-methylpropanesulfonic acid and salts thereof, a nonionic unsaturated monomer, and an amino group-containing unsaturated monomer.

6. The method for producing a water-absorbent resin according to claim 1, wherein the water-soluble ethylenically unsaturated monomer is a nonionic unsaturated monomer selected from the group consisting of (meth)acrylamide, N,N-dimethyl(meth)acrylamide, 2-hydroxyethyl(meth)acrylate, and N-methylol(meth)acrylamide.

7. The method for producing a water-absorbent resin according to claim 1, wherein the water-soluble ethylenically unsaturated monomer is an amino group-containing unsaturated monomer selected from the group consisting of diethylaminoethyl (meth)acrylate and diethylaminopropyl(meth)acrylate.

8. The method for producing a water-absorbent resin according to claim 1, wherein the water-soluble ethylenically unsaturated monomer has an acid group, and the acid group is neutralized with an alkaline neutralizer selected from the group consisting of an alkali metal salt and an ammonium salt.

9. The method for producing a water-absorbent resin according to claim 1, wherein the polymerization is conducted in the presence of a radical polymerization initiator selected from the group consisting of a persulfate, a peroxide, and an azo compound.

10. The method for producing a water-absorbent resin according to claim 1, wherein the polymerization is conducted in the presence of a radical polymerization initiator selected from the group consisting of potassium persulfate, ammonium persulfate, sodium persulfate, and 2,2'-azobis(2-amidinopropane)dihydrochloride.

11. The method for producing a water-absorbent resin according to claim 9, wherein the radical polymerization initiator is present in an amount of from 0.005 to 1% by mol, based on the total amount of the water-soluble ethylenically unsaturated monomer.

12. The method for producing a water-absorbent resin according to claim 1, wherein the polymerization is conducted in the presence of a surfactant selected from the group consisting of a polyglycerol fatty acid ester, a sucrose fatty acid ester, a sorbitan fatty acid ester, a polyoxyethylene sorbitan fatty acid ester, a polyoxyethylene glycerol fatty acid ester, a sorbitol fatty acid ester, a polyoxyethylene sorbitol fatty acid ester, a polyoxyethylene alkyl ether, a polyoxyethylene alkylphenyl ether, polyoxyethylene castor oil, polyoxyethylene hydrogenated castor oil, an alkylallylformaldehyde condensed polyoxyethylene ether, a polyoxyethylene polyoxypropylene block copolymer, a polyoxyethylene polyoxypropyl alkyl ether, a polyethylene glycol fatty acid ester, a polyoxyethylene alkylamine, a phosphoric ester of polyoxyethylene alkyl ether, and a phosphoric ester of polyoxyethylene alkylallyl ether.

13. The method for producing a water-absorbent resin according to claim 1, wherein the polymerization is conducted in the presence of a polymeric dispersing agent selected from the group consisting of maleic anhydride-modified polyethylene, maleic anhydride-modified polypropylene, maleic anhydride-modified ethylene-propylene copolymer, maleic anhydride-modified EPDM (ethylene-propylene-diene terpolymer), maleic anhydride-modified polybutadiene, ethylene-maleic anhydride copolymer, ethylene-propylene-maleic anhydride copolymer, butadiene-maleic anhydride copolymer, oxidized polyethylene, ethylene-acrylic acid copolymer, ethyl cellulose, and ethyl hydroxyethyl cellulose.

14. The method for producing a water-absorbent resin according to claim 12, wherein the surfactant is present in amount of from 0.1 to 5 parts by mass, based on the total amount of 100 parts by mass of the aqueous solution of the water-soluble ethylenically unsaturated monomer.

15. The method for producing a water-absorbent resin according to claim 13, wherein the surfactant is present in amount of from 0.1 to 5 parts by mass, based on the total amount of 100 parts by mass of the aqueous solution of the water-soluble ethylenically unsaturated monomer.

16. The method for producing a water-absorbent resin according to claim 1, wherein the polymerization is conducted in the presence of an internal crosslinking agent comprising two or more polymerizable unsaturated groups.

17. The method for producing a water-absorbent resin according to claim 16, wherein the polymerization is conducted in the presence of a compound having a reactive functional group capable of reacting with a carboxyl group.

18. The method for producing a water-absorbent resin according to claim 16, wherein the compound having a reactive functional group capable of reacting with a carboxyl group is a hydroxyalkyl(meth)acrylate or an N-hydroxyalkyl (meth)acrylamide.

19. The method for producing a water-absorbent resin according to claim 1, wherein reaction temperature is from 20° to 110° C.

20. The method for producing a water-absorbent resin according to claim 1, wherein the compound having plural hydrazide groups is selected from the group consisting of carbodihydrazide, malonic acid dihydrazide, maleic acid dihydrazide, itaconic acid dihydrazide, fumaric acid dihydrazide, adipic acid dihydrazide, sebacic acid dihydrazide, dodecanedioic acid dihydrazide, isophthalic acid dihydrazide, 1,6-hexamethylene bissemicarbazide, and 4,4'-(methylene-di-p-phenylene)disemicarbazide.

* * * * *